United States Patent
Zoualfaghari

(10) Patent No.: US 10,320,444 B2
(45) Date of Patent: Jun. 11, 2019

(54) COMMUNICATIONS NETWORK

(71) Applicant: British Telecommunications Public Limited Company, London (GB)

(72) Inventor: Mohammad Zoualfaghari, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/525,825

(22) PCT Filed: Nov. 10, 2015

(86) PCT No.: PCT/EP2015/076240
§ 371 (c)(1),
(2) Date: May 10, 2017

(87) PCT Pub. No.: WO2016/075155
PCT Pub. Date: May 19, 2016

(65) Prior Publication Data
US 2017/0324444 A1 Nov. 9, 2017

(30) Foreign Application Priority Data
Nov. 10, 2014 (EP) .................................... 14192568

(51) Int. Cl.
*H04B 3/04* (2006.01)
*H04L 7/00* (2006.01)
(Continued)

(52) U.S. Cl.
CPC ................ *H04B 3/04* (2013.01); *H04B 3/50* (2013.01); *H04B 3/52* (2013.01); *H04B 10/2507* (2013.01);
(Continued)

(58) Field of Classification Search
None
See application file for complete search history.

(56) References Cited

U.S. PATENT DOCUMENTS 6,014,376 A 1/2000 Abreu et al.
7,702,240 B2 4/2010 Minato
(Continued)

FOREIGN PATENT DOCUMENTS

CN 103873410 A 6/2014
FR 2972322 A1 9/2012
(Continued)

OTHER PUBLICATIONS

International Search Report for corresponding International Application No. PCT/EP2015/076240 dated Jan. 28, 2016; 6 pages.
(Continued)

Primary Examiner — Hong S Cho

(57) ABSTRACT

An optical network is disclosed which includes an optical fiber shared by a plurality of transmitters using code division multiple access techniques. The transmitters are connected by tributary optical fibers to the shared optical fiber. In code division multiple access techniques, each communication is encoded with a distinctive code which enables a receiver to extract the communication intended for it from amongst communications intended for other receivers. It is found that synchronizing the communications on the optical fiber improves the ability of a receiver to extract the communication intended for it. Injecting an optical pulse signal into the optical network, and using the tributary optical fibers to carry the clock signal to the transmitters provides an inexpensive method of synchronizing the transmitters which feed signals onto the optical fiber. The technology is of use in optical networks, and other transmission line networks, and is well-suited to use in local area networks.

13 Claims, 7 Drawing Sheets

(51) Int. Cl.
*H04B 3/52* (2006.01)
*H04J 14/00* (2006.01)
*H04B 3/50* (2006.01)
*H04B 10/2507* (2013.01)
*H04J 13/16* (2011.01)

(52) U.S. Cl.
CPC ............ *H04J 13/16* (2013.01); *H04J 14/005* (2013.01); *H04L 7/0008* (2013.01); *H04L 7/0075* (2013.01)

(56) References Cited

U.S. PATENT DOCUMENTS

| | | | |
|---|---|---|---|
| 10,021,662 B2 | 7/2018 | Virginas et al. | |
| 2002/0009074 A1* | 1/2002 | Iwahori | H04J 3/1611 370/358 |
| 2004/0047330 A1* | 3/2004 | Matsuno | H04B 1/707 370/342 |
| 2007/0249291 A1 | 10/2007 | Nanda et al. | |
| 2010/0054237 A1 | 3/2010 | Han et al. | |
| 2010/0097601 A1* | 4/2010 | Bato | H04B 10/0773 356/73.1 |
| 2012/0236977 A1 | 9/2012 | Zou et al. | |
| 2014/0169247 A1 | 6/2014 | Jafarian et al. | |
| 2015/0043398 A1 | 2/2015 | Fwu et al. | |
| 2016/0192278 A1 | 6/2016 | Ji et al. | |
| 2017/0324503 A1 | 11/2017 | Zoualfaghari | |

FOREIGN PATENT DOCUMENTS

| | | | |
|---|---|---|---|
| WO | WO 98/09390 A1 | 3/1998 | |
| WO | WO 2010/033286 A1 | 3/2010 | |

OTHER PUBLICATIONS

Written Opinion of the International Searching Authority for corresponding International Application No. PCT/EP2015/076240 dated Jan. 28, 2016; 11 pages.

Pruncal et al., "Spread spectrum fiber-optic local area network using optical processing," Journal of Lightwave Technology (May 1986) vol. LT-4, No. 5; p. 547-554.

Zhang, Jian-Guo, "High-speed optical fiber networks using code-division multiple access for future real-time computer communications," IEICE Transactions on Communications (Jul. 25, 1996) vol. E79-B, No. 7; p. 923-931. XP000628626.

Zoualfaghari et al., "Uniform cross-correlation modified prime code for applications in synchronous optical CDMA communication systems," Journal of Lightwave Technology (Sep. 15, 2012) vol. 30, No. 18; p. 2955-2963.

Zoualfaghari et al., "A novel multi-user interference cancellation scheme for synchronous OCDMA networks," Journal of Lightwave Technology (Jun. 1, 2013) vol. 31, No. 11; p. 1813-1820. XP011507567.

International Search Report and Written Opinion for PCT Application No. PCT/EP2015/076235 dated May 19, 2016; 10 pages.

International Preliminary Report on Patentability for PCT Application No. PCT/EP2015/076235 report completed on May 16, 2017; 8 pages.

Abdalla et al., "Cluster-Based Multihop Synchronization Scheme for Femotcell Network", IIUM Engineering Journal (2012) vol. 13, No. 2; pp. 161-172.

Amin et al., "Network Listening based Synchronization Techniques for Femtocell Systems", 2011 IEEE 22$^{nd}$ International Symposium on Personal, Indoor, and Mobile Radio Communication (PIMRC) Sep. 11-14, 2011; 5 pages.

Mehrpouyan et al., "A new distributed approach for achieving clock synchronization in heterogeneous networks", 2011 IEEE Global Telecommunications Conference (Globecom 2011) Dec. 5-9, 2011; 5 pages.

U.S. Appl. No. 15/525,864, filed May 10, 2017, Inventor(s): Zoualfaghari et al.

European Search Report for European Application No. 14192568.5; dated Apr. 30, 2015; 13 pages.

Examination Report for European Application No. 15791648.7; dated Jun. 18, 2018; 6 pages.

European Search Report for EP Application No. 15791648.7 dated Feb. 21, 2019; 7 pages.

* cited by examiner

COMMUNICATIONS NETWORK

CROSS-REFERENCE TO RELATED APPLICATIONS

The present application is a National Phase entry of PCT Application No. PCT/EP2015/076240, filed on 10 Nov. 2015, which claims priority to EP Patent Application No. 14192568.5, filed on 10 Nov. 2014, which are hereby fully incorporated herein by reference.

TECHNICAL FIELD

The present disclosure relates to a fixed communications network, a transmission system for use in a fixed communications network and a timing regulator and a multi-access interference suppressor for retro-fitting to existing fixed communications networks.

BACKGROUND

For reasons of efficiency, most telecommunication networks are not fully connected (i.e. there is not a separate line from each transmitter to each receiver). Instead, transmission lines are shared between a plurality of transmitter-receiver paths. Transmission lines include copper pairs, co-axial cables and optical fibers—the latter becoming predominant in modern fixed networks.

SUMMARY

According to a first aspect of the present disclosure, there is provided a fixed network comprising: a trunk transmission line; a plurality of tributary transmission lines; one or more signal couplers operable to couple the plurality of tributary transmission lines and the trunk transmission line; a plurality of transmitters each being operable to transmit a traffic data signal onto one of the tributary transmission lines, the traffic data signal representing traffic data encoded in accordance with a code division multiple access coding scheme; a timing signal source operable to provide a timing signal to the fixed network; the one or more signal couplers being operable to pass the traffic data signals from the transmitters onto the trunk transmission line, and to distribute the timing signal to the tributary transmission lines; wherein each of the transmitters is arranged in operation to receive the timing signal via a tributary transmission line and transmit the traffic data signals onto the tributary transmission line at a time dependent upon the timing signal, in order to synchronize the traffic data signals from different transmitters on the trunk transmission line.

In a network in which a plurality of transmitters transmit traffic data signals representing traffic data symbols encoded in accordance with a code-division multiple access (CDMA) scheme along tributary transmission lines to a trunk transmission line via one or more signal couplers coupling the trunk transmission line and the tributary transmission lines, by distributing a timing signal via the one or more signal couplers to each of the plurality of tributary transmission lines and thereby to one or more of the transmitters, and operating each of the plurality of transmitters to receive the timing signal and transmit a traffic data signal at a time dependent upon the timing signal, the traffic data signals representing each encoded traffic data symbol are synchronized on the trunk transmission line, thereby reducing, for each of one or more receivers, the amount of unwanted cross-correlation between traffic data signals encoded with the CDMA code applied to the current transmission to that receiver and data traffic signals encoded with other CDMA codes. The reduction in unwanted cross-correlation leads to an increase in the number of traffic data signals which can be simultaneously and successfully carried on the trunk transmission line.

In some embodiments, the fixed network has a bus network topology in which each of the transmitters is coupled (perhaps by a short tributary transmission line) to a single transmission line (the trunk transmission line). In other embodiments, the fixed network has a tree topology in which the trunk transmission line is connected to a plurality of transmitters via one or more branching points, each branching point being provided by a signal coupler. In yet other embodiments, relatively long tributary transmission lines form a tree topology which connects many terminals to a single head-end which includes a (possibly relatively short, perhaps even contained with the head-end) transmission line shared by the paths to the head-end from all the terminals. In yet other embodiments, the fixed network has a star network topology in which each of a group of transceivers is connected to a central coupler by a link—in cases where each link is bi-directional, each link is both a trunk transmission line (when the transceiver acts as a receiver), and a tributary transmission line (when the transceiver acts as a transmitter). In general, embodiments of the disclosure can form a variety of topologies in which the tributary transmission lines or trunk transmission line can be of various relative lengths.

The timing signal can be injected either directly onto the coupler or onto any of the transmission lines coupled by the coupler. If injected onto one of the tributary transmission lines, then the coupler coupling that tributary transmission line need only pass the timing signal onto the other transmission lines coupled by the coupler.

In some embodiments, the trunk transmission line comprises a trunk optical fiber, the signal coupler comprises an optical coupler and the tributary transmission lines comprise tributary optical fibers.

In some embodiments, the timing signal comprises a clock signal. Adding a clock signal provides the advantage that the complexity of the transmitters is reduced since they need not include an internal clock signal generator of sufficient accuracy to achieve the benefits of improved synchronization of traffic data signals in the trunk transmission line. Instead the transmitters can rely on the clock signal received via the tributary transmission line. In alternative embodiments, an occasional timing signal might be sent by the timing signal source, perhaps in response to a request for a timing signal from one of the transmitters, or perhaps in response to the degree of synchronization of the traffic data symbols on the trunk transmission line falling below a predetermined level.

In one embodiment, the period of the clock signal is equal to the symbol rate of the traffic to be encoded by each of the transmitters.

In one embodiment, the timing signal has a first frequency spectrum, and the traffic data signals have a second frequency spectrum distinct from the first frequency spectrum, and one or both of the first and second transmitters further comprise a filter to extract the timing signal from in amongst any traffic data signals present on the first or second tributary transmission line.

According to a second aspect of the present disclosure, there is provided a transmission system for use in a fixed communications network which has a plurality of tributary transmission lines coupled by one or more signal couplers to a trunk transmission line, the transmission system comprising: a modulator for transmitting a traffic data signal, representing traffic data encoded in accordance with a code division multiple access coding scheme, onto the tributary transmission line; a timing regulator including a timing signal input interface arranged to receive a timing signal from the tributary transmission line, the timing regulator being operable to delay the output of the traffic data signal from the transmission system until a time dependent on the timing signal in order to synchronize traffic data signals from different transmitters on the trunk transmission line.

In some embodiments, the transmission system further comprises an encoder operable to encode traffic data symbols in accordance with a code division multiple access coding scheme.

In one embodiment, the encoder is operable to encode each traffic data symbol using one of a set of codes, which set has the property that each subset of codes sums to a unique total. In one embodiment, the codes are optical codes (i.e. do not include negative values). In some embodiments, the set of optical codes are a set of prime codes. One example of a suitable code is the Uniform Cross-Correlation Modified Prime Code introduced in a paper entitled 'Uniform Cross-Correlation Modified Prime Code for Applications in Synchronous Optical CDMA Systems', by the present inventor and H. Ghafouri-Shiraz, in the IEEE Journal of Lightwave Technology, vol. 30, no. 18, Sep. 15, 2012. In systems where the encoded traffic data is binary data, and each '1' bit is encoded as the code associated with the intended receiver, and each '0' bit is encoded as a string of zeroes and hence does not contribute to the traffic data signal, the sum of the traffic data signals on the trunk transmission line indicates which receivers are intended to receive a coded '1' bit in the current bit period. This can be used to suppress signals to receivers which are not intended recipients of a coded '1' bit in the current bit period, and thus further reduce the chance of a receiver making an error in decoding the superposition of traffic data signals presented to it. This provides a yet further improvement in the capacity of the trunk transmission line.

In some embodiments, the timing regulator is arranged to receive the traffic data symbols and to delay the input of the traffic data to the encoder to a time dependent upon the timing signal.

This enables simple apparatus to provide the necessary synchronization of the CDMA signals. It is advantageous in situations where unsynchronized CDMA transmitters are already in operation, providing a straightforward upgrade to synchronized CDMA transmission.

In alternative embodiments, the timing regulator is arranged to receive the encoded traffic data, and to delay the output of the encoded traffic data to the modulator until a time dependent upon the timing signal.

In either case, the timing regulator in embodiments comprises: a buffer; and a buffer controller arranged in operation to buffer traffic data symbols or encoded traffic data until a time dependent upon the timing signal, whereupon the traffic data symbols or encoded traffic data respectively are passed to the encoder or the modulator, respectively.

To enable the straightforward upgrade mentioned above, according to a third aspect of the present disclosure there is provided a timing regulator for use in a fixed communications network having a plurality of tributary transmission lines coupled by one or more signal couplers to a trunk transmission line, the timing regulator comprising: a timing signal input interface for receiving a timing signal from a tributary transmission line; a traffic data input interface; a traffic data output interface for connection to a CDMA transmitter; a delay unit operable to delay the output of the traffic data from the traffic data output interface until a time dependent upon the timing signal.

According to a fourth aspect of the present disclosure, there is provided a multi-access interference suppressor for connection to a trunk transmission line in a network according to the first aspect of the present disclosure, the multi-access interference suppressor comprising: an interface for connection to the trunk transmission line; a plurality of line interfaces for connection to output lines to receivers; a code group resolver for identifying the subset of codes whose sum gives the unique summed code present on the trunk transmission line; a recipient group resolver for identifying the group of recipients corresponding to the identified code group; a switch associated with each of the line interfaces, each switch being arranged in operation to block transmission of the unique summed code over the line interface when the line interface corresponds to a receiver absent from the identified recipient group; and a timing signal generator operable to inject a timing signal onto the trunk transmission line for distribution to the plurality of transmitters.

Such a multi-access interference suppressor is of use in cases where transmitters encode each traffic data symbol using one of a set of codes, which set has the property that each subset of codes sums to a unique total. In such cases the multi-access interference suppressor blocks the provision of the unique total signal to receivers which are not in fact a target of any transmission. Hence, it follows that the risk of any untargeted receiver mistakenly interpreting the signal representing the sum of encoded traffic symbols as including a traffic data symbol for that receiver is obviated. Once again, this leads to an effective improvement in the capacity of the trunk transmission line. By including a timing signal generator in the multi-access interference suppressor, a single device can be provided which provides the benefits of multi-access interference suppression and a timing signal which can be distributed to transmitters in order for them to synchronize their transmission and thus enable the suppression.

BRIEF DESCRIPTION OF THE DRAWINGS

There now follows, by way of example only, a description of one or more embodiments of the disclosure. This description is given with reference to the accompanying drawings, in which.

DETAILED DESCRIPTION

Figure 1:
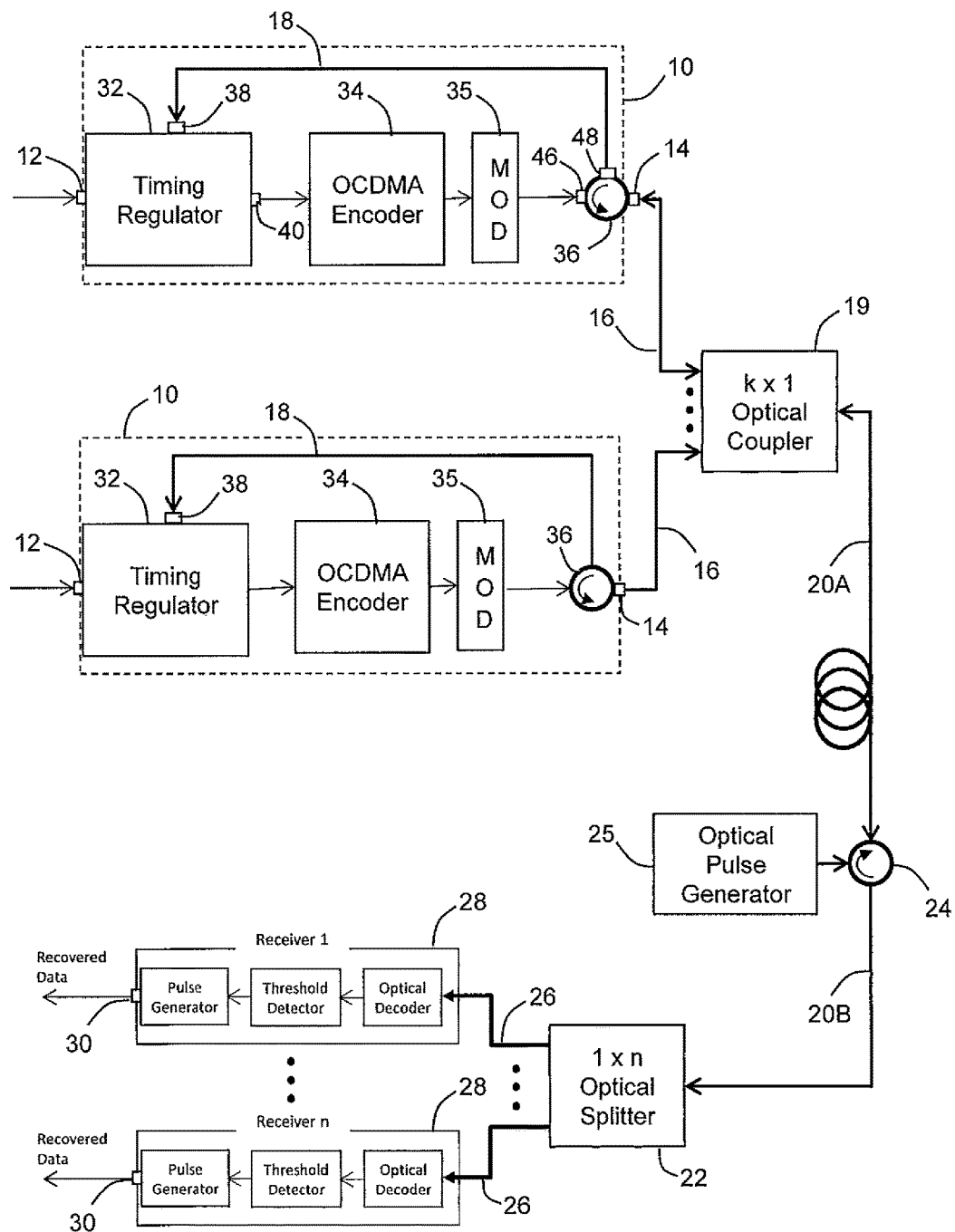
FIG. 1 shows a communications network in which the capacity of an optical fiber is shared between a plurality of transmission systems.

A communications network (FIG. 1) comprises a plurality of transmission systems 10, each of which has an addressed traffic data input 12 and an Optical Code Division Multiple Access (OCDMA) signal output 14. The OCDMA signal output 14 of each transmitter system 10 is connected by a feed-in optical fiber 16 to a k×1 optical coupler 19. In this embodiment, the feed-in optical fiber are all of substantially the same length. The k×1 optical coupler 19 is connected via the upstream section 20A of a shared optical fiber 20 to a shared three-port optical circulator 24. A downstream section 20B of the shared optical fiber 20 connects the shared three-port optical circulator to a 1×n optical splitter 22. The 1×n optical splitter 22 is in turn connected by a plurality of feed-out optical fibers 26 to respective receivers 28. Each receiver has an output 30 at which it generates a signal representing the traffic data addressed to that receiver received via the input port 12 of one of the transmitter systems 10.

The upstream section 20A of the shared fiber 20 terminates on a first port of the shared three-port optical circulator 24. The downstream section 20B of the shared fiber 20 is connected to a second port of the shared three-port optical circulator 24 and an optical pulse generator 25 is connected to the third port of the shared three-port optical circulator 24. As indicated by the clockwise direction of the circular arrow in the diagram, the shared optical circulator is configured to selectively pass any signal present on the upstream section 20A of the shared optical fiber 20 to the downstream section 20B, and to selectively pass any signal from the optical pulse generator 25 to the upstream section 20A of the shared optical fiber 20.

Each of the transmission systems 10 comprises a timing regulator 32, an OCDMA encoder 34 and a modulator 35 (these might be provided by a conventional unsynchronized Optical Code Division Multiple Access (OCDMA) transmitter) and a transmission-side optical circulator 36. A feed-in branch fiber 18 connects the transmission-side optical circulator 36 to the timing regulator 32. In this embodiment, the feed-in branch fibers 18 are all of substantially the same length. The timing regulator 32 includes the addressed traffic data input 12 mentioned above, a synchronized addressed traffic data output 40 which is connected to the input of the OCDMA encoder 34, and an input 38 from the feed-in branch fiber 18. The output of the OCDMA encoder 34 is fed to the modulator 35 which is in turn connected to an OCDMA signal input port 46 of the transmission-side optical circulator 36.

The transmission-side optical circulator 36 has three ports: the OCDMA signal input port 46 just mentioned, a feed-in branch fiber port 48, and the previously-mentioned OCDMA signal output 14 of the transmission system 10. As indicated by the anti-clockwise direction of the circular arrow in the diagram, the transmission-side optical circulator 36 is configured to add OCDMA signals arriving at the OCDMA signal input port 46 to the feed-in fiber 16, and thus on via the k×1 optical coupler 19 to the shared optical fiber 20. Also, the transmission-side optical circulator 36 is configured to optically connect the feed-in fiber 16 to the feed-in branch fiber 18.

In operation, two different types of optical signals are generated within the communications network.

The first type is an OCDMA signal generated by each of modulators 35. As will be understood by those skilled in the art, the OCDMA signal will result from the application of a so-called chip sequence (a code) to each '1' bit of the traffic data. The chip-sequence used depends upon the receiver to which the encoded traffic data is to be sent. The OCDMA encoder 34 identifies the receiver to which the encoded data is to be sent from the address included within the addressed traffic data. Since each bit is encoded using a chip sequence of many bits, the OCDMA signal generated by the modulator 35 has a 'chip-rate' which is many times higher than the bit-rate of the original digital traffic data.

In this embodiment, the modulator modulates a laser source of light of 1.55 µm wavelength.

The OCDMA signals are passed onto the feed-in fiber 16 and are combined by the k×1 optical coupler 19, passed onto the upstream section 20A of the shared fiber 20, around the shared optical circulator 24 and on to the 1×n optical splitter 22. From there a fraction of the combined OCDMA signals is passed via the feed-out fibers 26 to respective receivers 28.

Each receiver then extracts the component of the combined CDMA optical signals intended for it by using the chip sequence of the receiver, and outputs the traffic data via the traffic data output port 30.

The second type of optical signal generated within the network is an optical timing signal generated by the optical pulse generator 25 at the bit-rate of the traffic data received by each transmission system 10. In this embodiment, this signal is generated by on-off keying of a laser generating light of a wavelength of 1.3 µm.

Owing to the configuration of the optical network described above, the optical timing signal is present in operation on the upstream section 20A of the shared fiber, and a fraction of the optical timing signal is present on each of the feed-in fibers 16 and each of the feed-in branch fibers 18.

It will be realized from the above description that the optical signal present on the upstream section 20A of the shared fiber and each of the feed-in fibers 16 and feed-in branch fibers 18 will consist of a superposition of OCDMA signals and the optical timing signal. The spectra of the two signals will be separate from one another—in effect, they are frequency-division multiplexed on the upstream section 20A of the shared fiber.

Figure 2:
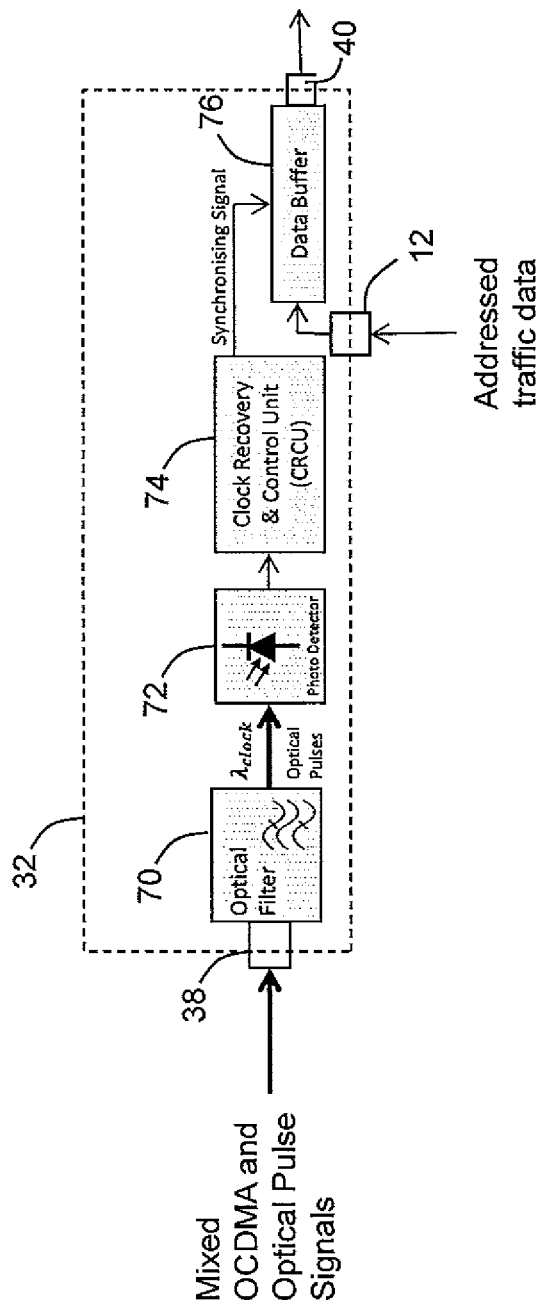
FIG. 2 shows the structure of a timing regulator unit included within each of the plurality of transmission systems.

Turning now to FIG. 2, the timing regulator of each transmission system 10 receives the superposition of OCDMA signals and optical timing signal at feed-in branch fiber port 38.

The feed-in branch fiber port 38 is connected to an optical filter 70, whose output is fed to photo-detector 72. The output of the photo-detector 72 is passed to clock recovery and control unit 74. The timing regulator 32 also has a data buffer 76 for temporarily storing the addressed traffic data arriving via transmission system input 12. The output of the clock recovery and control unit 74 is used as a clock signal to control the time at which each bit of traffic data is placed on the link to the OCDMA encoder 35. The optical filter 70 is a bandpass filter arranged to allow wavelengths close to the wavelength of the optical timing signal (in this embodiment, 1.3 µm) to pass, but to heavily attenuate other frequencies.

Figure 3:
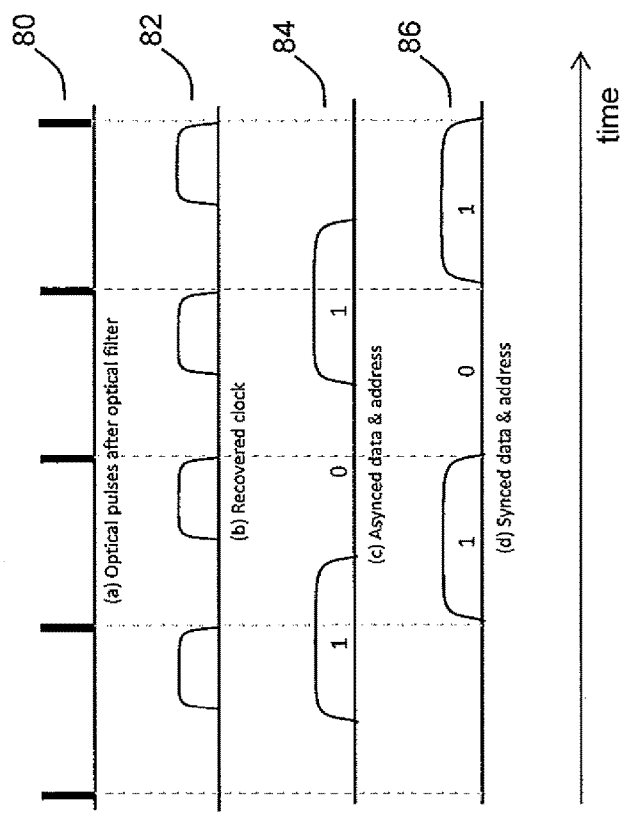
FIG. 3 is a timing diagram showing the effect of one of the timing regulator units.

The signals present in the timing regulator 32 are illustrated in FIG. 3. The output 80 of the bandpass filter 70 (which is dominated by the optical timing signal) is fed to photo-detector 72 which converts the pulses of the optical timing signal into an electrical signal. The clock recovery and control unit 74 takes the output of the photo-detector and generates a synchronizing signal 82 having a period equal to the time period of each traffic data bit. The synchronizing signal 82 is, in this example, a square wave whose falling edge coincides with the arrival of an optical pulse at the transmission system 10. The bits of the addressed traffic data arriving at the data buffer 76 arrive out of phase with the optical timing signal pulse. The synchronizing 82 signal from the clock recovery and control unit 74 is used to delay the transmission of each bit from the data buffer 76 (and hence delay the arrival of each bit at the OCDMA encoder 34) until the arrival of the next timing signal pulse.

In this embodiment, the traffic data is encoded using the Uniform Cross-Correlation Modified Prime Code introduced in a paper entitled 'Uniform Cross-Correlation Modified Prime Code for Applications in Synchronous Optical CDMA Systems', by the present inventor and H. Ghafouri-Shiraz, in the IEEE Journal of Lightwave Technology, vol. 30, no. 18, Sep. 15, 2012.

As explained in 'Spread Spectrum Fiber-Optic Local Area Network Using Optical Processing', Pruncal, P. R. et al, IEEE Journal of Lightwave Technology, vol. LT-4, no. 5, May 1986, prime codes are good candidates for optical CDMA networks because the signal-to-noise ratio of an optical CDMA network which uses them increases in direct proportion to the increase in the number of chips included in each chip sequence (a '1' bit is normally encoded as the chip sequence, whereas a '0' bit is encoded as a series of as many zeroes as there are chips in the chip sequence). The large bandwidth available in optical CDMA systems allows many more chips per bit than in other CDMA systems.

The benefit of using Uniform Cross-Correlation Modified Prime Codes (UC-MPC) over using basic prime codes is that the cross-correlation between signals destined for different receivers is one for all pairs of codes in the set of codes, the number of chips per bit is increased, and the auto-correlation is increased by one. This allows an increase in the number of active simultaneous users which can be supported by the OCDMA network.

A benefit of using UC-MPC over pure orthogonal codes and simple prime codes is that the code weight is increased (there are more ones in the codes), and this allows more users to be supported by the network. Using codes like UC-MPC introduces the problem of multi-access interference, but some embodiments overcome that, as will be explained below in relation to FIGS. 6 and 7.

Figure 4:
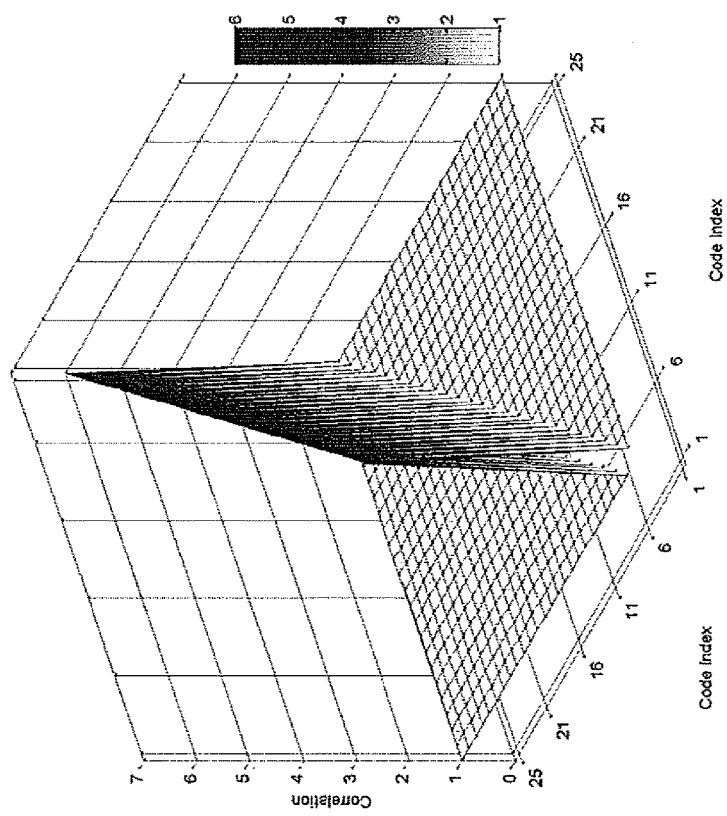
FIG. 4 illustrates the auto-correlation and cross-correlation of a particular set of 30-bit codes when encoded bits are aligned in time.
Figure 5:
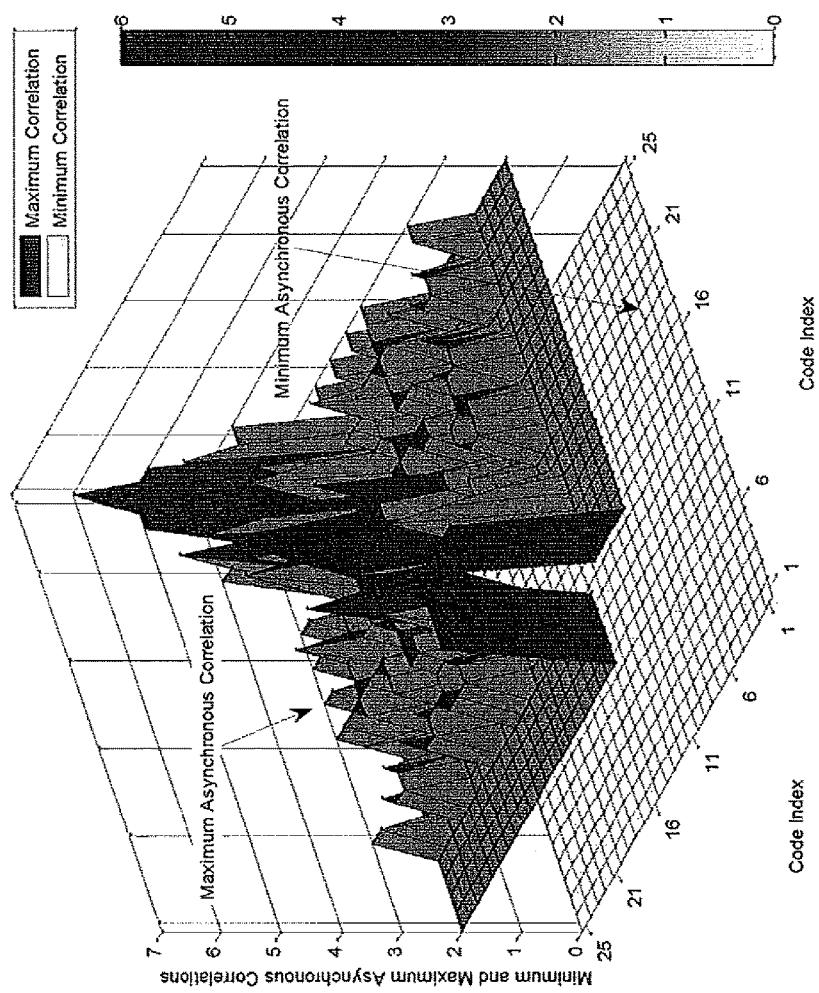
FIG. 5 illustrates the auto-correlation and cross-correlation of the same set of 30-bit codes are not aligned in time.

FIG. 4 shows the correlation properties between pairs of UC-MPC codes (of length $p^2+p$, where $p=5$ in this case) in the case where the chip sequences destined for different receivers are perfectly aligned in time. FIG. 5 shows how the cross-correlation can be considerably higher when the chip sequences are not aligned in time. Some of the worst cross-correlations can be avoided by not using all twenty-five of the available chip sequences, but this leads to a reduction in the number of simultaneous users who can be supported by the network.

Because, in the above embodiment a common optical timing signal is distributed to each of the transmission systems 10, and the feed-in fibers 16 to each transmission systems are of the same length as one another, and the feed-in branch fibers 18 are of the same length as one another, all the transmission systems receive a synchronized optical timing signal.

Furthermore, because the transmission systems 10 are the same, the buffering in the data buffer 76 in the timing regulator (FIG. 2) results in the transmission of an encoded traffic data symbol simultaneously from each of the transmitters. The equal length of the feed-in fibers then results in the simultaneous arrival of the OCDMA signals from the different transmitters at the k×1 optical coupler 19. The OCDMA signals then follow a shared path to the 1×n optical splitter 22, and the receivers 28. The OCDMA signals thus arrive simultaneously at each receiver 28. This leads to the reduction in cross-correlation as seen in FIG. 4 in comparison to FIG. 5, and hence allows each receiver 28 to more reliably ignore signal components which are intended for other receivers.

In some embodiments, where installed feed-in fibers 16 are not the same length, then the optical path to the k×1 optical coupler 19 from each transmission system 10 can be made the same length by the addition of an appropriate delay length to all the feed-in fibers 16 save for the longest feed-in fiber 16.

Depending on the rate of the optical timing signal, and the speed of light in the feed-in branch fibers 16, light will travel a predetermined distance (here referred to as a 'bit-length' in a clock period). In other embodiments, all the feed-in fibers are not made the same length, but instead are adjusted to a length which is a predetermined length longer than an integer number of bit-lengths. In an embodiment with normal clock rates (e.g. 1 GHz), and speed of light in fiber ($2*10^8$ ms$^{-1}$), a bit length is 20 cm, so these other embodiments can achieve the benefits of synchrony of arrival of encoded traffic data bits with the addition of only short lengths of fiber to the feed-in fibers 16.

Because the optical pulse generator 25 adds the timing signal to the shared fiber 20, and because of the bi-directional optical path provided by the k×1 optical coupler 19 and feed-in fibers 16, the same fibers can be used for both transmitting a clock signal to each of the transmission systems, and carrying OCDMA signals from the transmission systems 10 to the shared fiber 20. This provides a synchronous OCDMA network more cheaply than has hitherto been achieved.

In cases where an unsynchronized OCDMA network is already installed, the network operator can cheaply and efficiently upgrade the network to a synchronous OCDMA network by adding an optical pulse generator 25, and a shared circulator 24 to the shared part of the network, and a transmission-side circulator 36, feed-in branch fiber 16 and a timing regulator 32 to each unsynchronized OCDMA transmitter 34. The network operator might choose to upgrade a subset of the asynchronous OCDMA transmitters 34, as this would still increase the number of users who are supported by the network.

In other embodiments, the optical pulse generator 25 and shared circulator 24 could be placed in the same housing as the 1×n optical splitter 22 (the downstream section 20B of the shared fiber then being an internal component of the integrated device).

Other embodiments offer further benefits from the time-alignment of the OCDMA signals in the shared optical fiber. As explained in 'A Novel Multi-User Interference Cancellation Scheme for Synchronous OCDMA Networks' by the inventor and Hooshang Ghafouri-Shiraz in the IEEE Journal of Lightwave Technology, vol. 31, no. 11, Jun. 1, 2013, UC-MPC codes, provided they are time-aligned with one another, have the additional property that the sum of the chip sequences is unique for each possible combination of intended receivers for the combined OCDMA signals. In order to take advantage of this property of UC-MPC codes, in another embodiment, a multi-access interference suppression unit (FIG. 6) is provided which shuts off optical signals to receivers 28 which are not included amongst the intended recipients of the combined OCDMA signals.

In more detail, the multi-access interference suppression unit (FIG. 6) includes the optical circulator 24, and optical pulse generator 25 as discussed in relation to the above embodiments. The 1×n optical splitter 22 is replaced in this embodiment with a 1×(n+1) optical splitter 90. The extra output from the splitter 90 is fed to a local photodetector 92 whose output is monitored by a control unit 94. The control unit 94 is a micro-controller in this embodiment, though in other embodiments a microprocessor might be used instead. Memory 96 associated with the micro-controller stores a look-up table 98. The look-up table 98 lists, for each of the possible combinations of current receivers, the corresponding unique summed code sequence. The micro-controller has an interface to an optical switch (102a-102n) on each of the output lines to the receivers. Each of the optical switches (102a-102n) is preceded by an optical delay line which stores the combined OCDMA signals taken from the shared optical fiber 20 for one clock period.

The micro-controller 94 is controlled by a software or firmware program to find the total energy in the combined signal on the optical fiber 20, and thereby find the number of receivers 28 intended to receive a coded '1' bit in the current clock period. Using that information, and the summed code sequence from the output of the photodetector 92, the micro-controller then accesses the look-up table 98 to find the group of receivers intended to receive a coded '1' bit in the current clock period. Having found the group of intended receivers 28, the micro-controller 94 then controls optical switches 102a to 102n to shut off the optical signal to receivers not included in the group. The optical delay lines (100a-100n) are configured so that the signal present at the optical switches corresponds to the signal on which the receiver group derivation was based.

Figure 7:
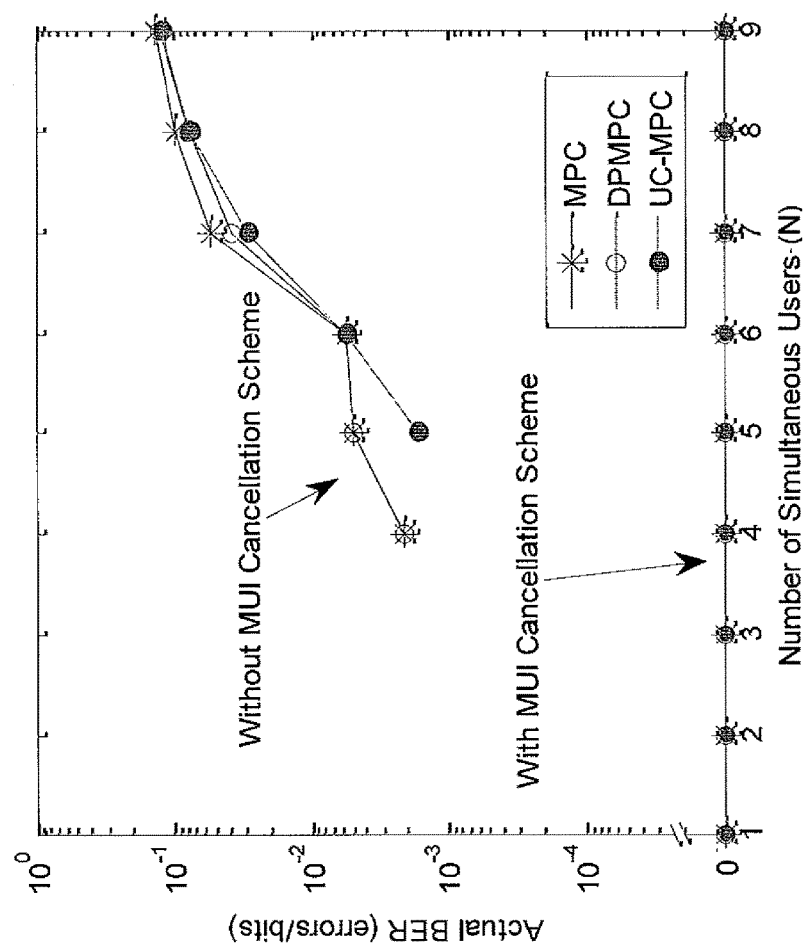
FIG. 7 shows how multi-access interference is reduced in some embodiments.

The use of a multi-access interference suppression unit in this embodiment results in the almost complete cancellation of the effects of multi-access interference, as can be seen from FIG. 7. This in turn increases the number of users who can simultaneously use the communications network.

It will be seen how the addition of just one unit to the shared communications medium (the multi-access interference suppression unit) and the addition of a feed-in branch fiber 18, circulator 36 and timing regulator 32 to each existing unsynchronized CDMA transmitter 34, provides a way of upgrading an installed unsynchronized CDMA network to a synchronized CDMA network offering a markedly improved performance.

As well as showing the results for the UC-MPC codes used in the above embodiments, the graph (FIG. 7) shows impressive improvements for other prime code families as well. In order to use Modified Prime Code (MPC), new MPC (n-MPC) or Double-Padded Modified Prime Code (DP-MPC), in a yet further embodiment, an additional network element—a code enhancement unit—is added to the network. The code enhancement unit has an additional input into the optical coupler 19 (which thus becomes a (k+1)×1 optical coupler). The traffic data for each of the transmission systems 10 is additionally passed to the code enhancement unit which then calculates a differentiating code sequence to be added to the encoded traffic data symbols generated by the transmission systems 10 to render the sum of the encoded traffic data symbols unique even for codes which do not normally exhibit this property. The code enhancement unit then adds a 1.55 μm signal modulated with the differentiating code sequence to the input of the optical coupler 19. The code enhancement unit is synchronized in the same way as the transmitters are synchronized in the above-described embodiments.

A method of deriving the necessary differentiating code sequence is presented in 'A Novel Multi-User Interference Cancellation Scheme for Synchronous OCDMA Networks' by the inventor and Hooshang Ghafouri-Shiraz in the IEEE Journal of Lightwave Technology, vol. 31, no. 11, Jun. 1, 2013.

Figure 6:
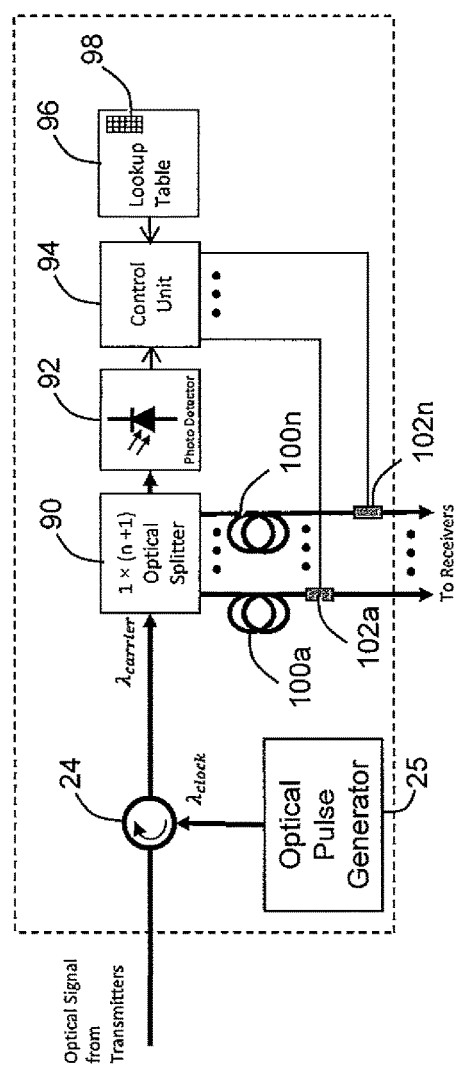
FIG. 6 shows a multi-access interference suppressor included in another embodiment of the present disclosure.

Possible variations on the above embodiments include (this list is by no means exhaustive):

i) whilst the above embodiment described the use of Direct Sequence Spread Spectrum encoding, in other embodiments frequency-hopping and/or time-spreading code division multiple access techniques could be used instead;

ii) whilst the clock signal in the above embodiments was injected onto the shared fiber at a point on the receiver side of the shared fiber 20, the clock signal could instead be injected at any other position on the shared fiber 20. In some cases, the clock signal could be injected onto one of the feed-in optical fibers 16, or directly into the optical coupler 19;

iii) the transmitters and receivers in the above embodiments could be components of transceivers;

iv) whilst optical circulators were used in the above embodiment to pass signals from a source onto a selected optical fiber, in alternative embodiments optical add-drop multiplexers could be used instead;

v) in the above-described embodiments, the feed-in fibers all met at the optical coupler. In other embodiments, the coupling of the various feed-in fibers might occur in stages, so that the feed-in fibers have a tree-like topology with the shared optical fiber 20 forming the trunk and a plurality of optical couplers providing the divergence points at which the feed-in fibers branch outwards towards the transmitters. In other embodiments, the optical splitter 22 might be replaced by a plurality of splitters, thus forming a tree-like topology on the receiver-side of the network also;

vi) in the above described embodiment, the OCDMA signals were the modulated output of 1.55 μm lasers, and the clock signal was the modulated output of a 1.3 μm laser. In other embodiments, other wavelengths could be used for the two signals. For example, the clock signal could be modulated 1.554 μm light, and the OCDMA signals could be modulated 1.556 μm light;

vii) in other embodiments, the optical clock signal is also used to control the timing of the operations of the multi-access interference suppressor;

viii) in other embodiments, the optical clock signal is used to control the timing of the operations of the receivers as well as the transmitter;

ix) in other embodiments, the timing signal might be an occasional signal output by the optical signal generator, rather than a periodic signal. The transmitters might then include local oscillators which enable them to stay synchronized with one another until the arrival of the next timing signal. In some embodiments, the timing signal might be output by the optical signal generator in response to a request for a timing signal issued by one of the transmitters;

x) in the above embodiments, the data traffic signals were encoded with a code specific to the intended receiver, in other embodiments, the code might be a code specific to the transmitter which is communicated to the intended receiver. Other code agreement protocols will be known to those skilled in the art;

xi) the transmission-side circulator 36 in the above embodiment could be replaced with an optical coupler;

xii) in cases where the feed-in fibers are of different lengths, time-alignment of the OCDMA signals in the shared fiber 20 might instead by achieved by configuring the transmitter to delay its transmission of traffic data signals by a configurable amount of time, or a configurable delay could be applied to the clock signal in the transmitter;

xiii) although optical signals and optical fibers were used in the above embodiments, in other embodiments, electrical signals or Radio-Frequency signals might be used in wires or waveguides (for example a co-axial cable) respectively;

xiv) in the FIG. 6 embodiment, the optical clock signal might additionally be provided to the control unit 94 in order to synchronize the control unit 94 with the transmission systems 10—especially in cases where the data signals are not organized into frames which enable the control unit to maintain synchronization, this will lead to improved performance of the multi-access interference canceller;

xv) similarly, the optical clock signal might additionally be provided to the receivers 28 in order to allow them to be synchronized with the transmission systems 10.

In summary of the above disclosure, an optical network is disclosed which includes an optical fiber shared by a plurality of transmitters using code division multiple access techniques. The transmitters are connected by tributary optical fibers to the shared optical fiber. In code division multiple access techniques, each communication is encoded with a distinctive code which enables a receiver to extract the communication intended for it from amongst communications intended for other receivers. It is found that synchronizing the communications on the optical fiber improves the ability of a receiver to extract the communication intended for it. Injecting an optical pulse signal into the optical network, and using the tributary optical fibers to carry the clock signal to the transmitters provides an inexpensive method of synchronizing the transmitters which feed signals onto the optical fiber. The technology is of use in optical networks, and other transmission line networks, and is well-suited to use in local area networks.

The invention claimed is:

1. A fixed network comprising:
a trunk transmission line;
a plurality of tributary transmission lines;
one or more signal couplers operable to couple the plurality of tributary transmission lines and the trunk transmission line;
a plurality of transmitters each being operable to transmit a traffic data signal onto one of the tributary transmission lines, the traffic data signal representing traffic data encoded in accordance with a code division multiple access (CDMA) coding scheme;
a timing signal source operable to provide a timing signal to the fixed network;
the one or more signal couplers being operable to pass the traffic data signals from the transmitters onto the trunk transmission line, and to distribute the timing signal to the tributary transmission lines;
wherein each of the transmitters is arranged in operation to receive the timing signal via a tributary transmission line and transmit the traffic data signals onto the tributary transmission line at a time dependent upon the timing signal, in order to synchronize the traffic data signals from different transmitters on the trunk transmission line.

2. A network according to claim 1 wherein the trunk transmission line comprises a trunk optical fiber, the one or more signal couplers comprise optical couplers and the tributary transmission lines comprise tributary optical fibers.

3. A network according to claim 1 wherein the timing signal comprises a clock signal.

4. A network according to claim 3 in which a rate of the clock signal is equal to a symbol rate of the traffic to be encoded by each of the transmitters.

5. A network according to claim 1 wherein the timing signal has a first frequency spectrum, and the traffic data signals have a second frequency spectrum distinct from the first frequency spectrum, and one or more of the transmitters further comprise a filter to extract the timing signal from in amongst any traffic data signals present on the tributary transmission line to which the transmitters are connected.

6. A transmission system for use in a fixed communications network which has a plurality of tributary transmission lines coupled by one or more signal couplers to a trunk transmission line, the transmission system comprising:
a modulator for generating a traffic data signal representing traffic data encoded in accordance with a code division multiple access (CDMA) coding scheme, on the tributary transmission line;
a timing regulator including a timing signal input interface arranged to receive a timing signal from the tributary transmission line, the timing regulator being operable to delay output of the traffic data signal from the transmission system until a time dependent on the timing signal in order to synchronize traffic data signals from different transmitters on the trunk transmission line.

7. A transmission system according to claim 6 further comprising an encoder operable to encode traffic data symbols in accordance with the CDMA coding scheme.

8. A transmission system according to claim 7 wherein the timing regulator is arranged to receive the traffic data symbols and to delay input of the traffic data to the encoder to a time dependent upon the timing signal.

9. A transmission system according to claim 8 wherein the timing regulator comprises:
a buffer; and
a buffer controller arranged in operation to buffer traffic data symbols until a time dependent upon the timing signal, whereupon the traffic data symbols are passed to the encoder.

10. A timing regulator for use in a fixed communications network having a plurality of tributary transmission lines coupled by one or more signal couplers to a trunk transmission line, the timing regulator comprising:
a timing signal input interface for receiving a timing signal from a tributary transmission line;
a traffic data input interface;
a traffic data output interface for connection to a code division multiple access (CDMA) transmitter; and
a delay unit operable to delay output of the traffic data from the traffic data output interface until a time dependent upon the timing signal in order to synchronize traffic data signals from different transmitters on the trunk transmission line.

11. A timing regulator according to claim 10 wherein the delay unit comprises:
a traffic data buffer; and
a traffic data buffer controller arranged in operation to buffer traffic data received via the traffic data input interface for an amount of time dependent upon a timing signal received via the timing signal input interface, before transmitting the traffic data from the traffic data output interface.

12. A timing regulator according to claim 11 further comprising a filter for extracting the timing signal from in amongst traffic data signals present on the tributary transmission line.

13. A multi-access interference suppressor for connection to a trunk transmission line in a network according to claim 1, the multi-access interference suppressor comprising:
- an interface for connection to the trunk transmission line;
- a plurality of line interfaces for connection to output lines to receivers;
- a code group resolver for identifying a subset of codes whose sum gives a unique summed code present on the trunk transmission line, the identified subset of codes being an identified code group;
- a recipient group resolver for identifying a group of recipients corresponding to the identified code group, the identified group of recipients being an identified recipient group;
- a switch associated with each of the line interfaces, each switch being arranged in operation to block transmission of the unique summed code over the line interface when the line interface corresponds to a receiver absent from the identified recipient group; and
- a timing signal generator operable to inject a timing signal onto the trunk transmission line for distribution to the plurality of transmitters.

* * * * *